United States Patent
Campini et al.

(10) Patent No.: US 7,083,422 B2
(45) Date of Patent: Aug. 1, 2006

(54) SWITCHING SYSTEM

(75) Inventors: Edoardo Campini, Mesa, AZ (US); David R. Formisano, Chandler, AZ (US); Marwan A. Khoury, San Jose, CA (US); Ho Wang, Scottsdale, AZ (US); Arsham Andy Saffarian, Scottsdale, AZ (US); Jerome A. Saint-Cyr, Portland, OR (US); Douglas L. Stahl, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/824,323

(22) Filed: Apr. 13, 2004

(65) Prior Publication Data

US 2005/0227505 A1   Oct. 13, 2005

(51) Int. Cl.
*H01R 12/00* (2006.01)
(52) U.S. Cl. .......................... 439/61; 361/788; 710/100
(58) Field of Classification Search .................. 439/61, 439/59; 710/300, 100; 361/788, 686
See application file for complete search history.

(56) References Cited

U.S. PATENT DOCUMENTS

| | | | |
|---|---|---|---|
| 5,951,659 A * | 9/1999 | McElroy et al. ............. 710/300 |
| 6,105,088 A * | 8/2000 | Pascale et al. .............. 710/100 |
| 6,356,966 B1 * | 3/2002 | Loach et al. ................... 439/78 |
| 6,473,822 B1 * | 10/2002 | Nakamatsu et al. ......... 710/300 |
| 6,903,939 B1 * | 6/2005 | Chea et al. .................. 361/788 |
| 2002/0072255 A1 * | 6/2002 | Leman ......................... 439/61 |
| 2003/0169577 A1 * | 9/2003 | Linares et al. .............. 361/788 |
| 2004/0221084 A1 * | 11/2004 | Yates et al. ................. 710/305 |

* cited by examiner

*Primary Examiner*—Michael C. Zarroli
(74) *Attorney, Agent, or Firm*—S. K. Murthy

(57) ABSTRACT

A switching system includes a backplane having slots, each including a first set of connectors designed according to a common specification. The slots include at least one extended slot and at least two normal slots, each normal slot including the first set of connectors, each extended slot including the first set of connectors and an additional second set of connectors. The backplane has signal lines to support a data channel between first set of connectors of the normal slot and the extended slot. The backplane also has signal lines to support a data channel between first set of connectors of the normal slot and the second set of connectors of the extended slot.

25 Claims, 18 Drawing Sheets

SWITCHING SYSTEM

BACKGROUND

Peripheral Component Interconnect Industrial Computer Manufacturers Group 3.0 Advanced Telecommunications Computing Architecture (PICMG® 3.0 AdvancedTCA™) specification, as approved on Dec. 30, 2002 by the PICMG Executive Membership (hereinafter referred to as the ATCA specification), provides guidelines for a standard chassis form factor, intra-chassis interconnects, and platform management interfaces suitable for high-performance, high-bandwidth computing and communications systems.

DETAILED DESCRIPTION

Figure 1:
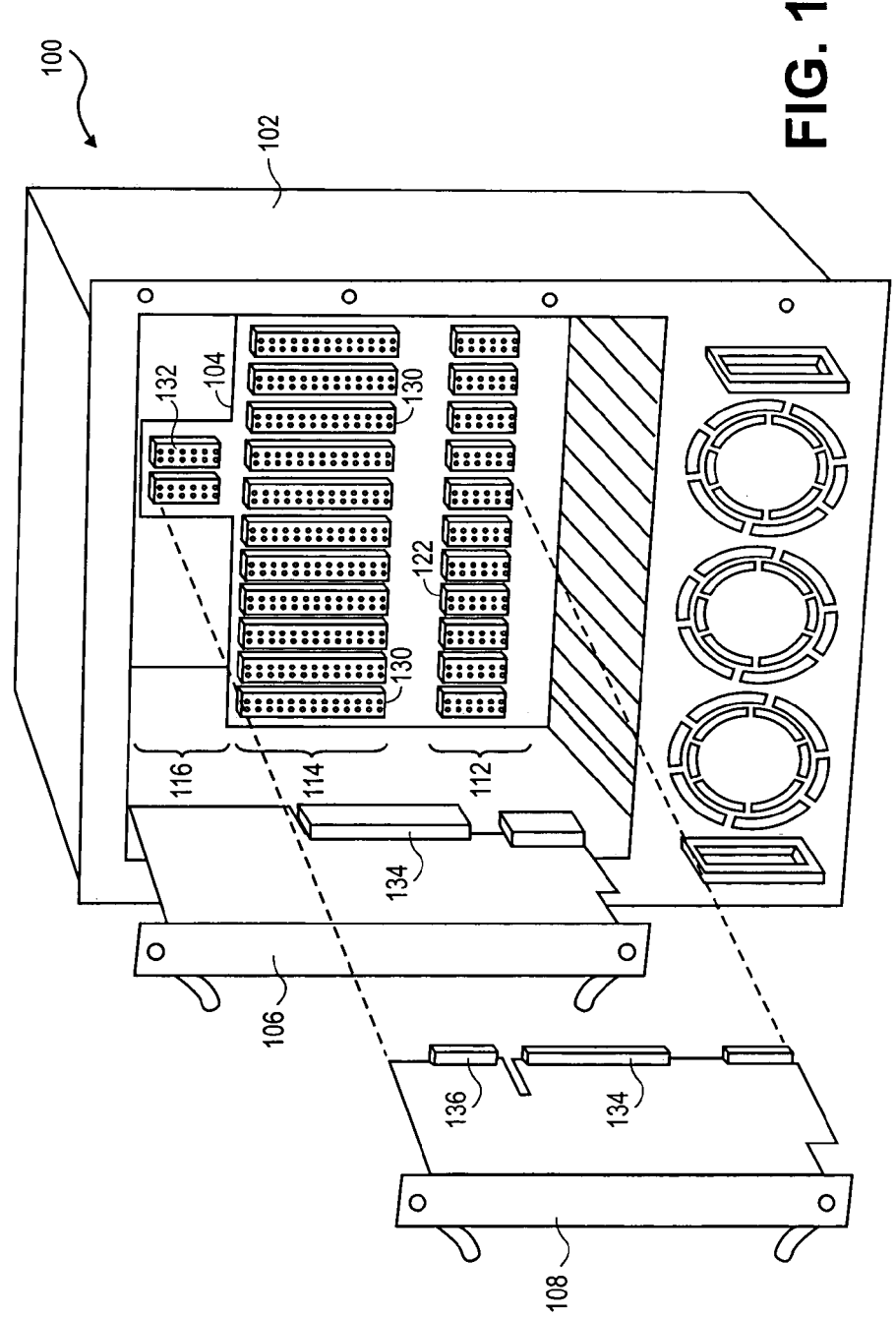
FIG. 1 shows an extended ATCA system.
Figure 2:
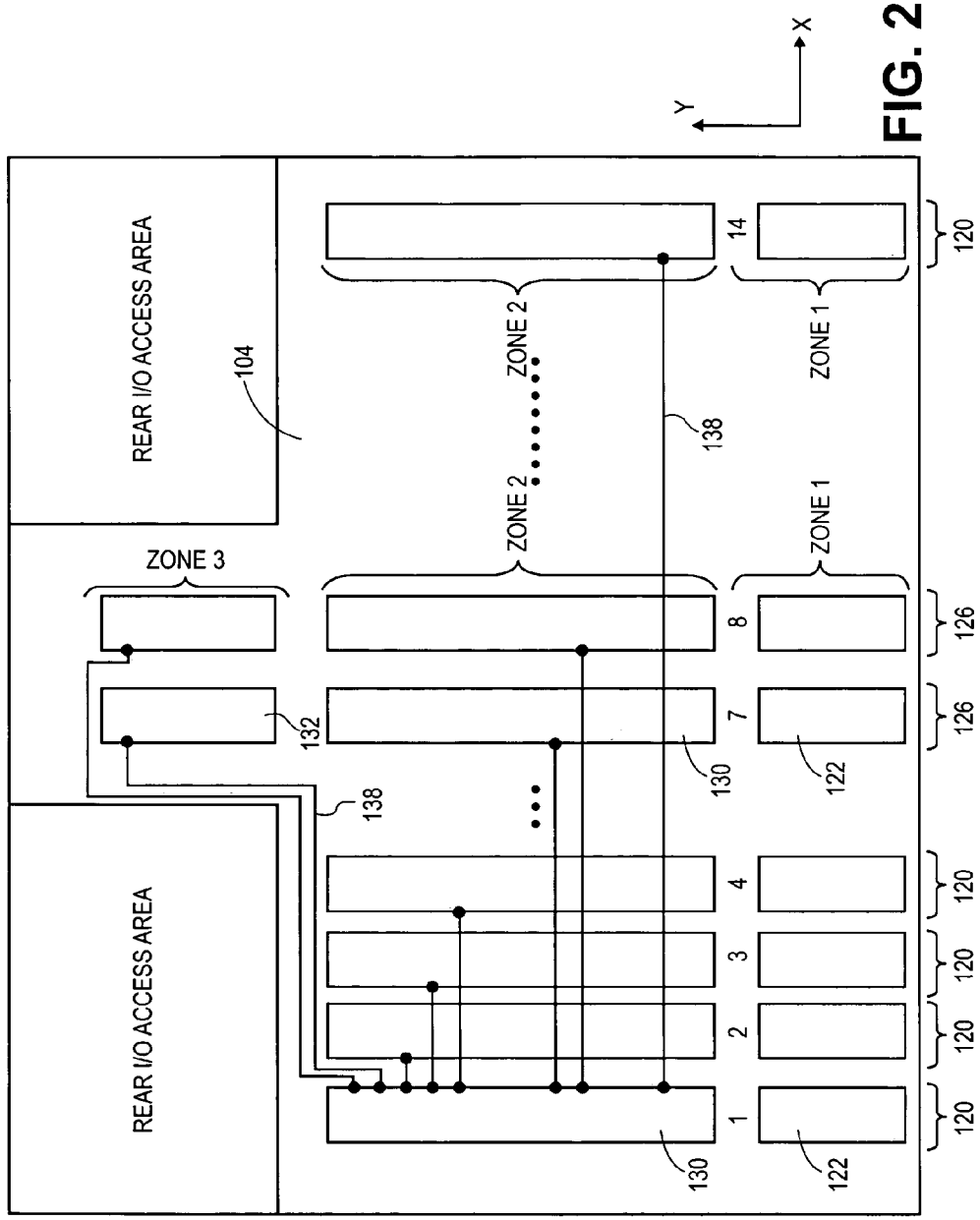
FIG. 2 shows a backplane that supports 14 slots.

Referring to FIGS. 1 and 2, an extended ATCA system 100 includes a cabinet 102 (or chassis) that houses a backplane 104, one or more line cards, and one or more switch cards. In this example, the backplane 104 has fourteen slots (numbered 1 to 14 from left to right as depicted in FIG. 2) that are spaced apart along an X-direction, with each slot also extending along a Y-direction (FIG. 1 only shows eleven slots, as viewing of three of the slots is block by a side wall of the cabinet). Signal lines 138 (FIG. 2) support communication channels among the slots. The cabinet 102 can also be configured to support more or less slots.

Each of slots 1–6 and 9–14 is a "normal" slot 120 that has connectors 122 and 130 that occupy zones 1 and 2, respectively, of the slot. The normal slots 120 can interface with normal line cards (e.g., 106) or normal switch cards (not shown). Each of slots 7 and 8 is an "extended" slot 126 that has connectors 122, 130, and 132 that occupy zones 1, 2, and 3, respectively, of the slot. Zones 1, 2, and 3 refer to different regions of the extended slot along the Y-direction.

The extended slots 126 can interface with extended switch cards (e.g., 108) that use connectors 122, 130, and 132. The connectors 122 and 130 of the extended slots 126 have similar configurations as the connectors 122 and 130 of the normal slots, so the extended slots 126 can also interface with normal line cards 106 and normal switch cards. To accommodate the extended slots 126 that are longer than the normal slots 120, the backplane 104 has a shape that resembles the letter T or an inverted T.

In FIG. 2, the connectors 122, 130, and 132 are shown as blocks. Each block can include several connectors that connect to different signal lines. For example, the connectors 130 of a slot can include several ZD connectors, each having several differential pairs. ZD connectors are available from Erni Electronics, Inc., Midlothian, Va.

The normal slots 120 and the extended slots 126 are compatible with the ATCA specification, which specifies that connectors in zone 3 are user-defined. The specification specifies that the zone 1 connectors are allocated for power, management, and other ancillary functions. The zone 2 connectors are allocated to support data transport interfaces (base and fabric interfaces), an update channel interface, and a synchronization clock interface.

The normal line cards 106 may use the zone 3 connectors to connect with rear transition modules to provide rear input/output accesses. For switch cards whose main function is to switch signals or data packets of other line cards housed within the cabinet 102, there is less need for rear input/output accesses. The extended switch cards 108 use some or all of the connectors in zone 3 to support additional communication channels so as to increase the bandwidth of line card switching. The extended slots 126 have connectors 122 and 130 to provide backward compatibility with normal line cards or switch cards that do not use zone 3 connectors to support additional channels.

In one example, each normal line card 106 has three ZD connectors 134 (which mate with ZD connectors 130 on the backplane 104) in zone 2 to support 15 channels. Each extended switch card has three ZD connectors 134 in zone 2 to support 15 channels, and three ZD connectors 136 (which mate with ZD connectors 132 on the backplane 104) in zone 3 to support an additional 15 channels. Each channel is supported by 4 ports, each port using 4 serializer/deserializers (SERDES) that operate at 2.5 gigabits per second (Gbs), providing 10 Gbs bandwidth per channel. Because of overhead (such as SERDES encoding information), the maximum useful data bandwidth can be about 8 Gbs per channel. As described below, each extended slot 126 supports two channels to each normal slot 120, thus supporting 20 Gbs bandwidth between each normal line card and each extended switch card, providing more than 10 Gbs of useful data throughput.

In the example of FIG. 2, the backplane 104 supports fourteen slots, and the signal lines 138 support full-mesh, star, dual-star, or dual-dual-star interconnect topologies. Each signal line 138 in FIG. 2 represents a collection of signal lines that support a channel described above. For each normal slot 120, the ZD connectors 130 in zone 2 support fifteen channels, which can include thirteen channels to each of the other normal slots 120, one channel to a zone 2 connector in each of the extended slots 126, and one channel to a zone 3 connector in each of the extended slots 126. The configuration of data channels supported by signal lines 138 is illustrated in more detail in FIG. 3.

Figure 3:
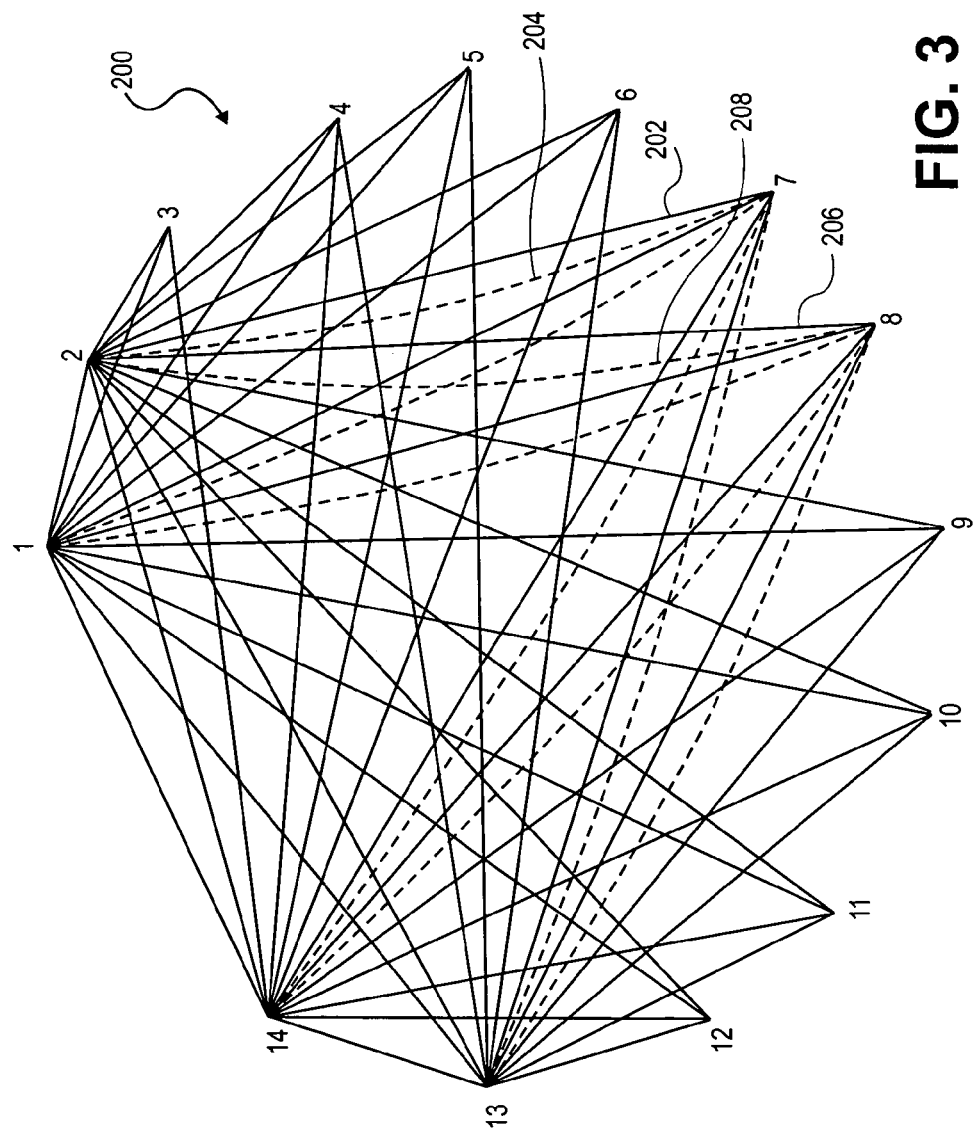
FIG. 3 shows an interconnection topology for the backplane of FIG. 2.

Referring to FIG. 3, in one example, signal lines 138 form an interconnection topology 200 that supports full-mesh, star, dual-star, dual-dual-star, and other types of topologies. The numbers 1 to 14 represent slots 1 to 14. Each line connecting two numbers represents a channel between the two slots represented by the two numbers. For clarity of illustration, not all of the channels are shown for all slots (for example, all channels that connect to slots 1, 2, 13, and 14 are shown, while only some of the channels that connect to slots 3–12 are shown).

Two channels connect slot 7 to each of the normal slots (slots 1–6 and 9–14), one shown as a solid line and the other shown as a dashed line. For example, a channel 202 connects a zone 2 connector of slot 2 to a zone 2 connector of slot 7, and a channel 204 connects a zone 2 connector of slot 2 to a zone 3 connector of slot 7. Similarly, two channels connect slot 8 to each of the normal slots, one shown as a solid line and the other shown as a dashed line. For example, a channel 206 connects a zone 2 connector of slot 2 to a zone 2 connector of slot 8, and a channel 208 connects a zone 2 connector of slot 2 to a zone 3 connector of slot 8.

Figure 4:
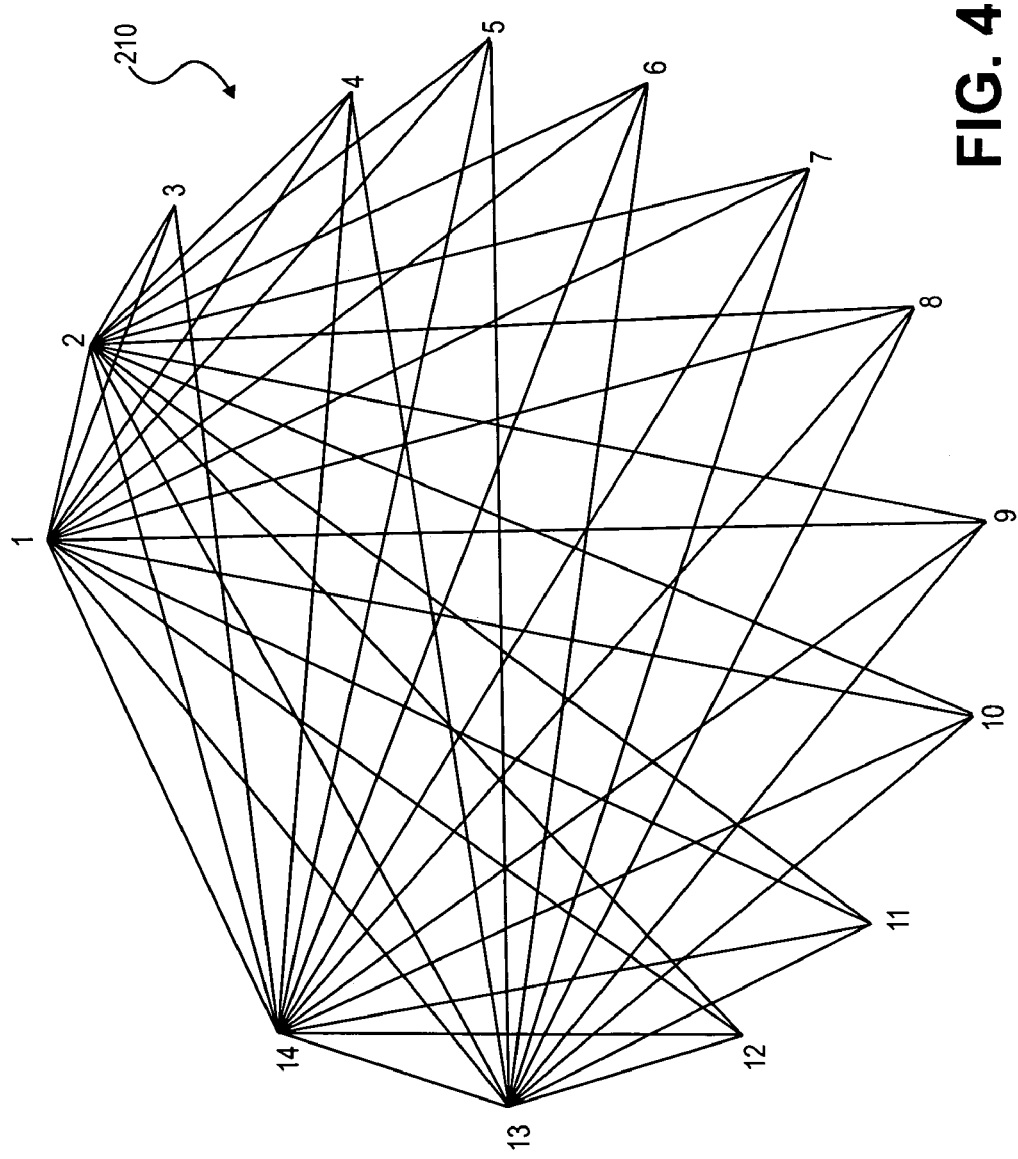
FIGS. 4–6 show switch fabric topologies supported by the interconnection topology of FIG. 3.

Referring to FIG. 4, the interconnection topology 200 supports a full-mesh topology 210, where each slot is connected to every other slot, and no centralized switching is used. For clarity of illustration, in FIG. 4, all channels that connect to slots 1, 2, 13, and 14 are shown, while only some of the channels that connect to slots 3–12 are shown. In this example, the channels that connect to the zone 3 connectors of slots 7 and 8 are not used. Because there is one channel between every two slots, the full-mesh topology 210 supports standard data throughput (e.g., 10 Gbs), similar to a conventional ATCA backplane. In other examples, the channels connected to the zone 3 connectors of slots 7 and 8 can be used to increase transmission bandwidths to and from slots 7 and 8.

Figure 5:
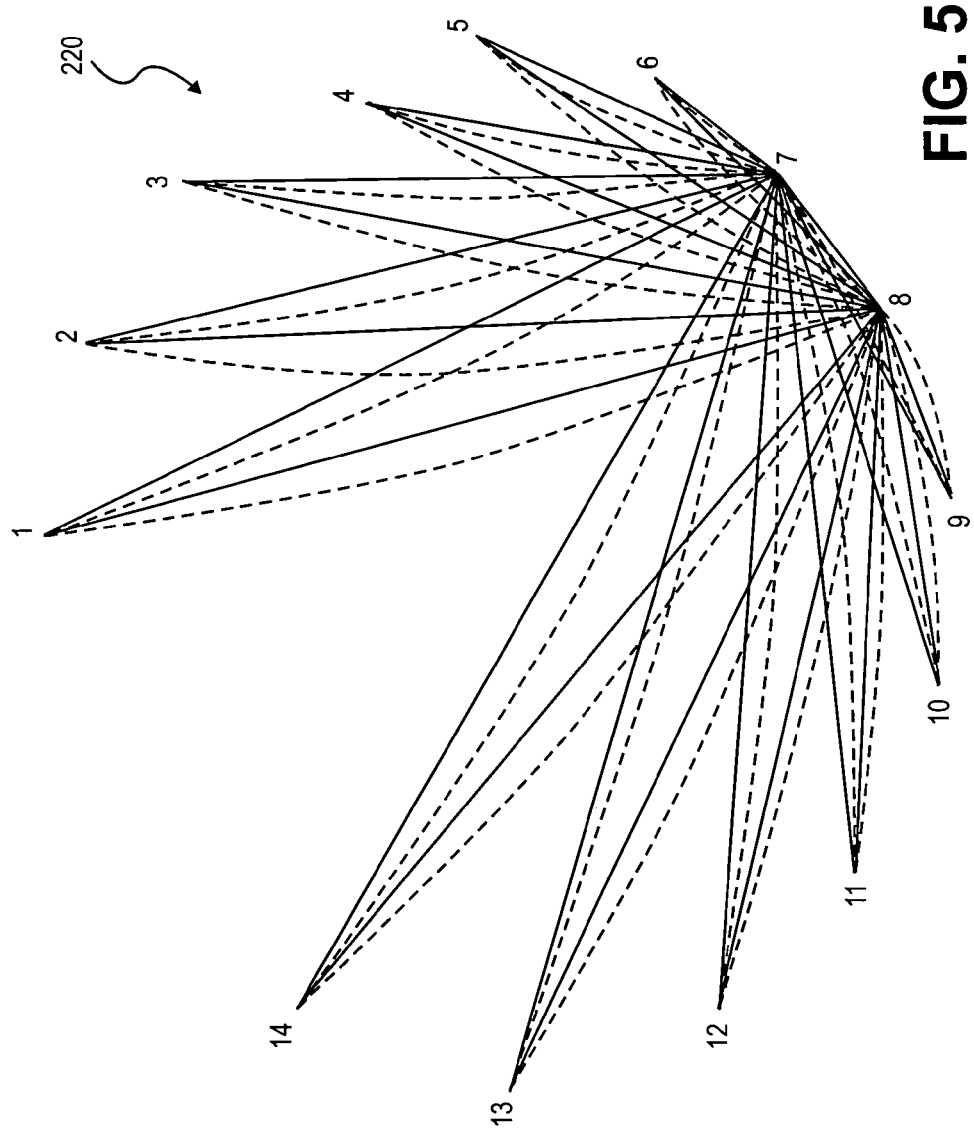

Referring to FIG. 5, the interconnection topology 200 supports a dual-star topology 220, where the normal slots (slots 1–6 and 9–14) interface with normal line cards 106, and the extended slots (slots 7 and 8) interface with extended switch cards 108 that form centralized switching hubs. The switch cards 108 and the line cards 106 are set up so to have information on which channel is connected to which slot. In one example, the line cards and switch cards are provided with information on which switch card functions as a primary switch and which switch card functions as a secondary switch. Because there are two channels between each line card 106 and each switch card 108, the dual-star topology 220 supports increased data throughput (e.g., 20 Gbs), which can be twice as much as the data throughput (e.g., 10 Gbs) provided by conventional ATCA backplanes.

Figure 6:
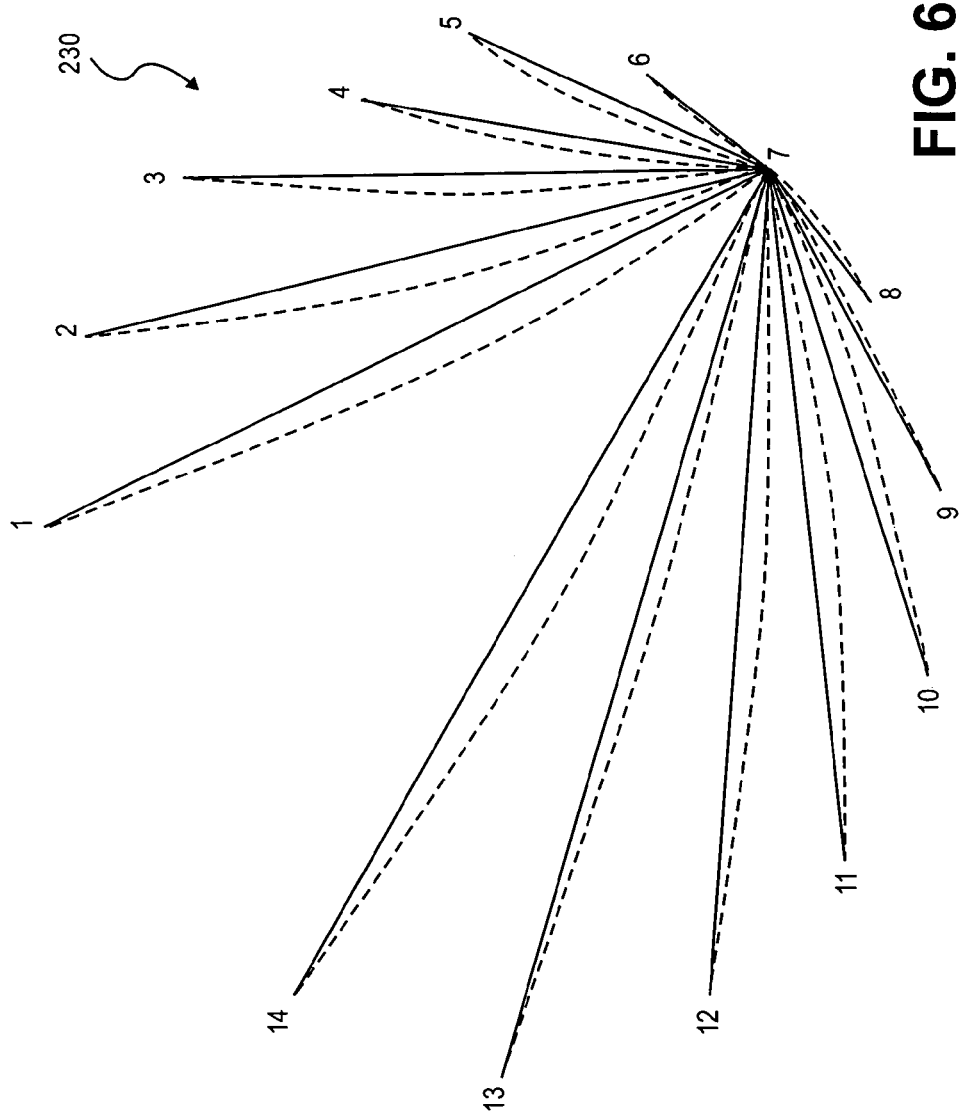

Referring to FIG. 6, the interconnection topology 200 supports a star topology 230, where the normal slots (slots 1–6 and 9–14) interface with normal line cards 106, and slot 7 interfaces with an extended switch card 108, which forms a centralized switching hub. In this example, slot 8 can be used to interface with a line card. Because there are two channels between each line card 106 and the switch card 108, the star topology 230 supports increased data throughput (e.g., 20 Gbs), as compared to the data throughput (e.g., 10 Gbs) provided by conventional ATCA backplanes.

Figure 7:
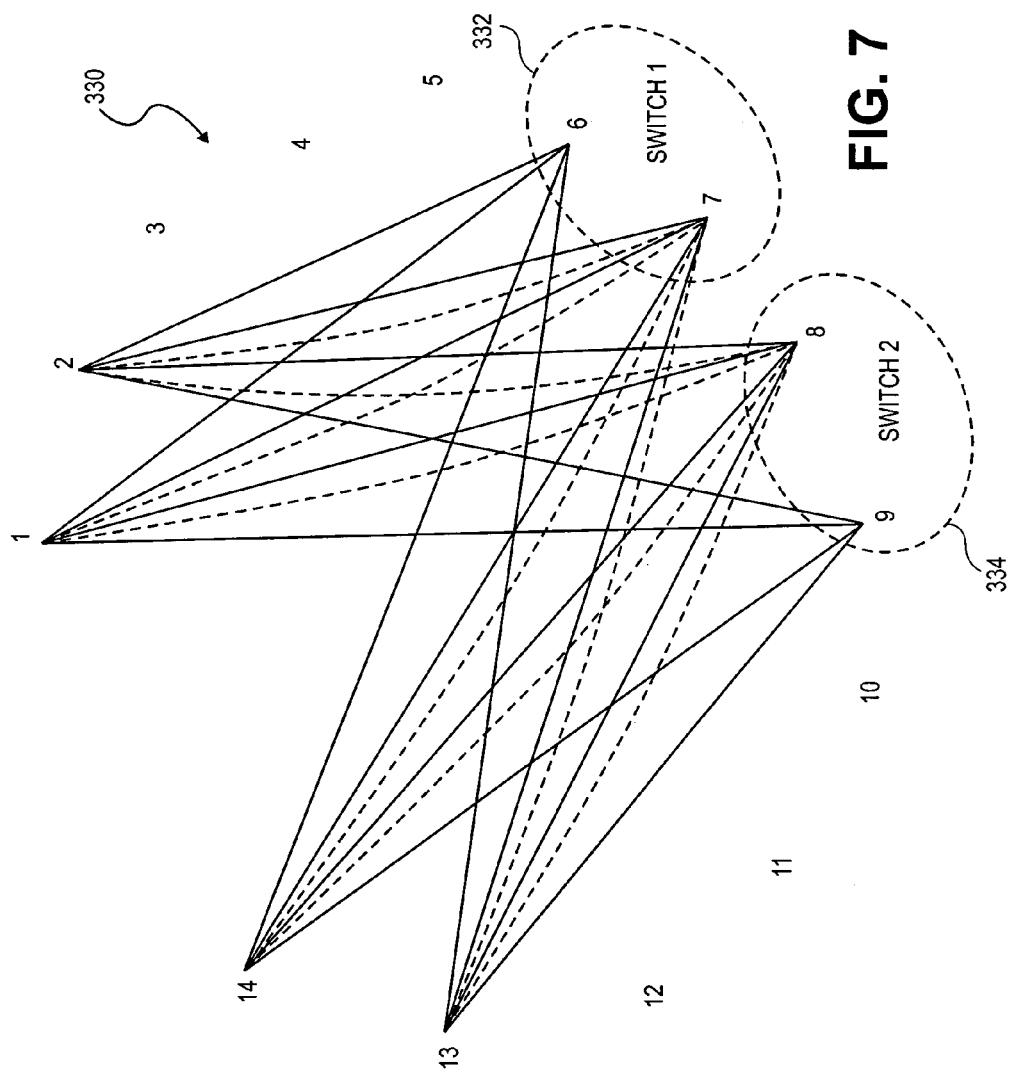
FIG. 7 shows a switch fabric topology supported by the interconnection topology of FIG. 3.

Referring to FIG. 7, the interconnection topology 200 supports a dual-dual-star topology 330, where two switch hubs occupy four slots (slots 6–9). Each of the normal slots 1–5 and 10–14 interfaces with a normal line card 106. One centralized switch 332 is configured to interface with a normal slot 6 and an extended slot 7, and utilizes the zone 2 connectors of slot 6, and zone 2 and zone 3 connectors of slot 7. Another centralized switch 334 is configured to interface with an extended slot 8 and a normal slot 9, and utilizes the zone 2 connectors of slot 9, and zone 2 and zone 3 connectors of slot 8. For clarity of illustration, in FIG. 7, all channels that connect to slots 1, 2, 13, and 14 are shown, only some channels that connect to slots 6–9 are shown, and channels that connect to slots 3–5 and 10–12 are not shown.

Because there are three channels between each line card 106 and the centralized switch, the dual-dual-star topology 330 supports increased data throughput (e.g., 30 Gbs), as compared to the data throughput (e.g., 20 Gbs) providing by using a conventional ATCA backplane with switch hubs that each occupy two slots.

Figure 8:
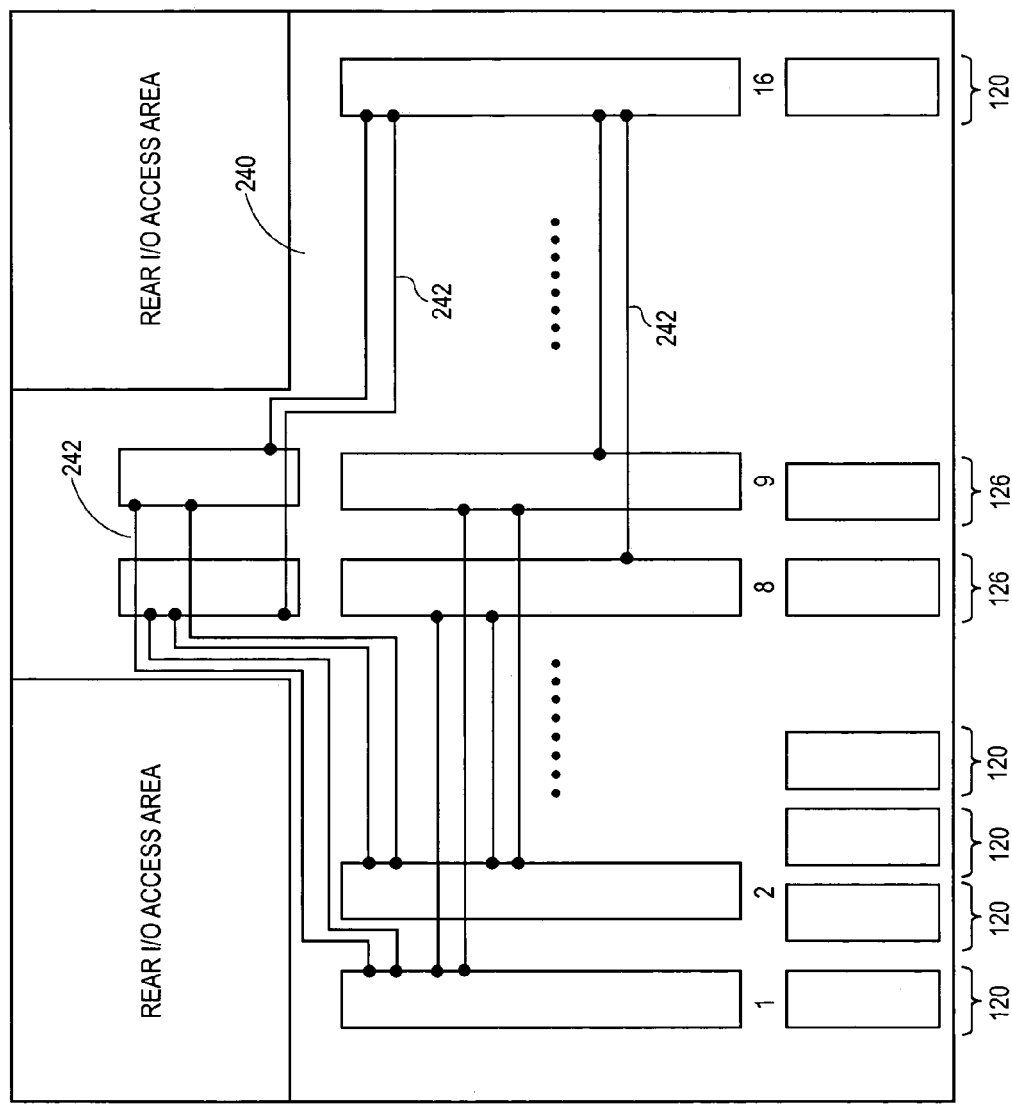
FIG. 8 shows a backplane that supports 16 slots.

Referring to FIG. 8, a backplane 240 supports star, dual-star, dual-dual-star, and other types of topologies (other than full-mesh). Backplane 240 supports sixteen slots, which includes fourteen normal slots (slots 1–7 and 10–16), and two extended slots (slots 8 and 9). Backplane 240 has signal lines 242 that connects the connectors of different slots. Each signal line 242 in the figure represents a collection of signal lines that support a data channel.

Figure 9:
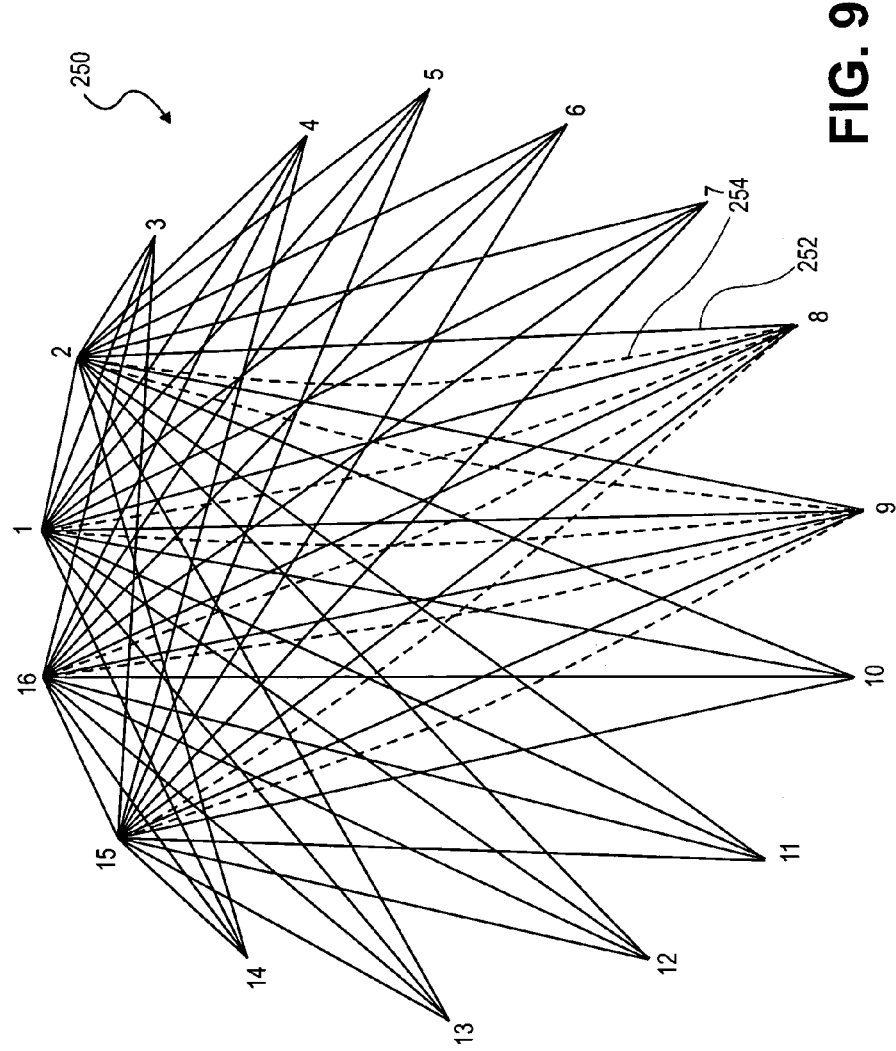
FIG. 9 shows an interconnection topology for the backplane of FIG. 8.

Referring to FIG. 9, the signal lines 242 form an interconnection topology 250 that supports star, dual-star, dual-dual-star, and other types of topologies (other than full-mesh). For clarity of illustration, all channels that connect to slots 1, 2, 15, and 16 are shown, while only some of the channels that connect to slots 3–14 are shown. Two channels connect each of slots 8 and 9 to each of the normal slots (slots 1–7 and 10–16), one channel shown in a solid line and the other channel shown in a dashed line. For example, a channel 252 connects a zone 2 connector of slot 2 to a zone 2 connector of slot 8, and a channel 254 connects a zone 2 connector of slot 2 to a zone 3 connector of slot 8. Each normal slot, in addition to connecting to the extended slots 8 and 9, can connect to eleven other normal slots.

Figure 10:
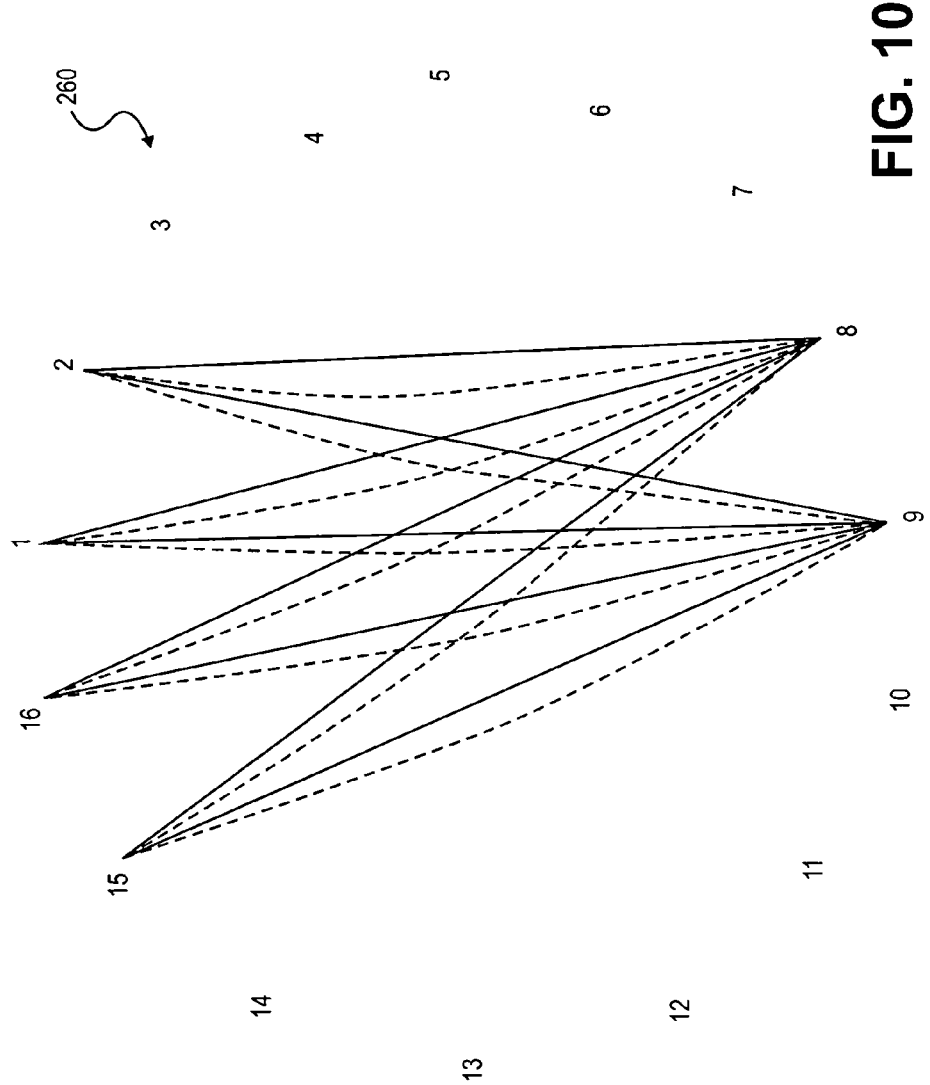
FIGS. 10 and 11 show switch fabric topologies supported by the interconnection topology of FIG. 9.

Referring to FIG. 10, the interconnection topology 250 supports a dual-star topology 260, where the normal slots (slots 1–7 and 10–16) interface with normal line cards 106, and the extended slots (slots 8 and 9) interface with extended switch cards 108, which form centralized switching hubs. For clarity of illustration, all channels that connect to slots 1, 2, 15, and 16 are shown, some channels that connect to slots 8 and 9 are shown, and channels that connect to slots 3–7 and 10–14 are not shown. Similar to the dual-star topology 220 (FIG. 5), the dual-star topology 260 supports increased data throughput, which can be twice as much as the data throughput provided by conventional ATCA backplanes.

Figure 11:
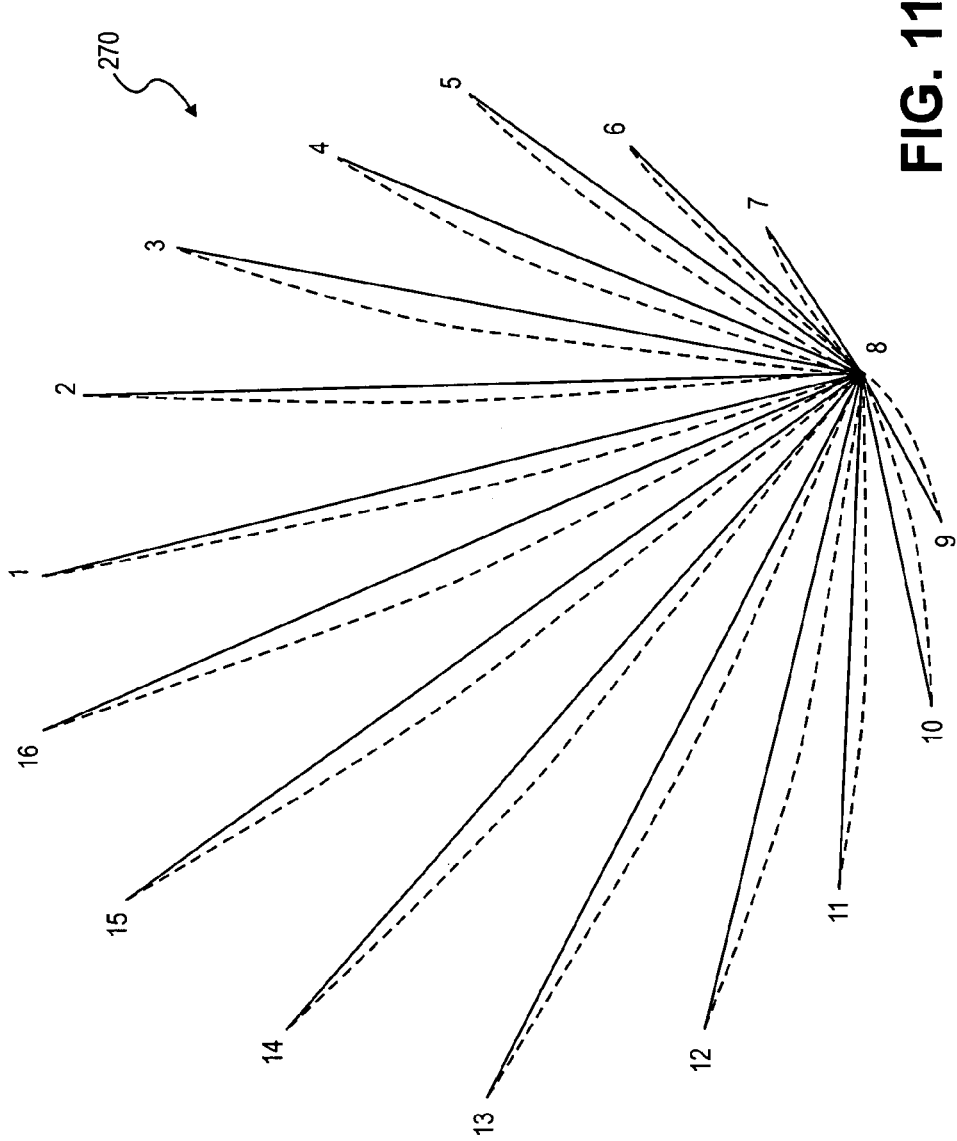

Referring to FIG. 11, the interconnection topology 250 supports a star topology 270, where the normal slots (slots 1–7 and 10–16) interface with normal line cards 106, and the extended slot 8 interface with a centralized switch implemented by an extended switch card 108. In this example, slot 9 can be used to interface with a line card. Similar to the star topology 230 (FIG. 6), the star topology 270 supports increased data throughput, which can be twice as much as the data throughput provided by conventional ATCA backplanes.

Figure 12:
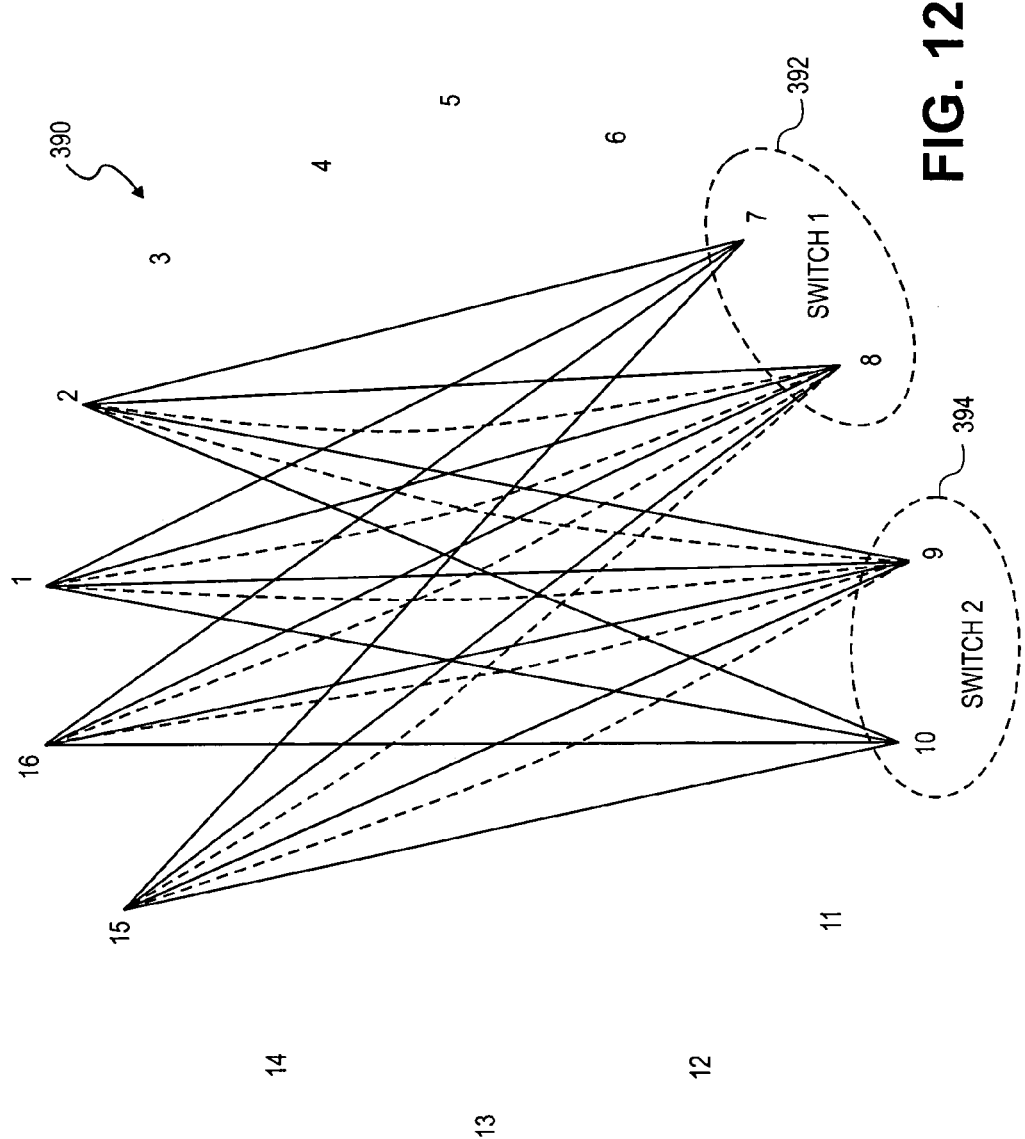
FIG. 12 shows a switch fabric topology supported by the interconnection topology of FIG. 9.

Referring to FIG. 12, the interconnection topology 250 supports a dual-dual-star topology 390, where two switch hubs occupy four slots (slots 7–10). Each of the normal slots 1–7 and 11–16 interfaces with a normal line card 106. One centralized switch 392 is configured to interface with a normal slot 7 and an extended slot 8, and utilizes the zone 2 connectors of slot 7, and zone 2 and zone 3 connectors of slot 8. Another centralized switch 394 is configured to interface with an extended slot 9 and a normal slot 10, and utilizes the zone 2 connectors of slot 10, and zone 2 and zone 3 connectors of slot 9. For clarity of illustration, in FIG. 12, all channels that connect to slots 1, 2, 15, and 16 are shown, only some channels that connect to slots 7–10 are shown, and channels that connect to slots 3–6 and 11–14 are not shown.

Because there are three channels between each line card 106 and each centralized switch, the dual-dual-star topology 390 supports increased data throughput (e.g., 30 Gbs), as compared to the data throughput (e.g., 20 Gbs) providing by using a conventional ATCA backplane with switch hubs that each occupy two slots.

Figure 13:
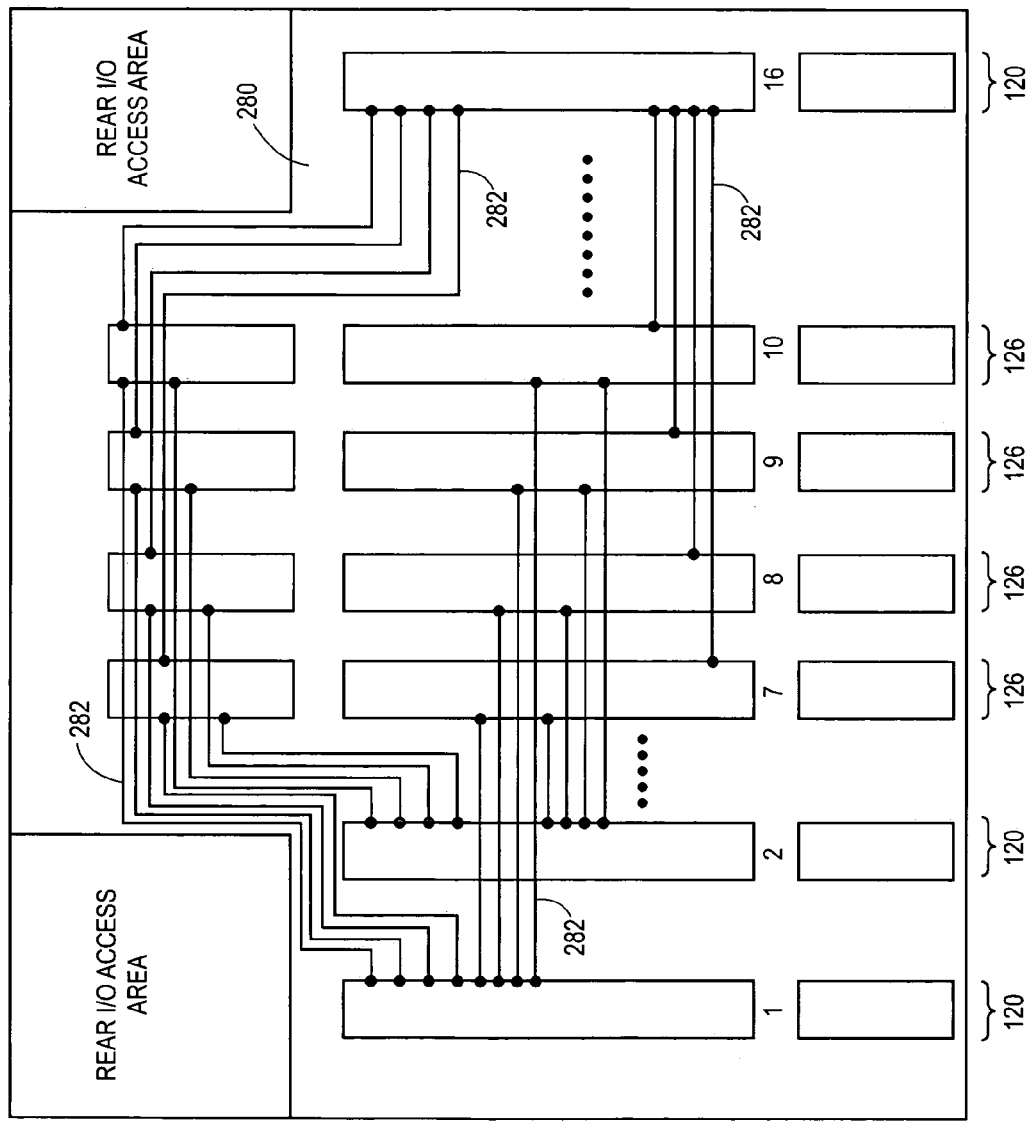
FIG. 13 shows a backplane that supports 16 slots.

Referring to FIG. 13, a backplane 280 supports star, dual-star, dual-dual-star, and other types of topologies (other than full-mesh). Backplane 280 supports sixteen slots, which include twelve normal slots 120 (slots 1–6 and 11–16), and four extended slots (slots 7–10). Backplane 280 has signal lines 282 that connect the connectors of different slots. Each signal line 282 in the figure represents a collection of signal lines that support a data channel.

Figure 14:
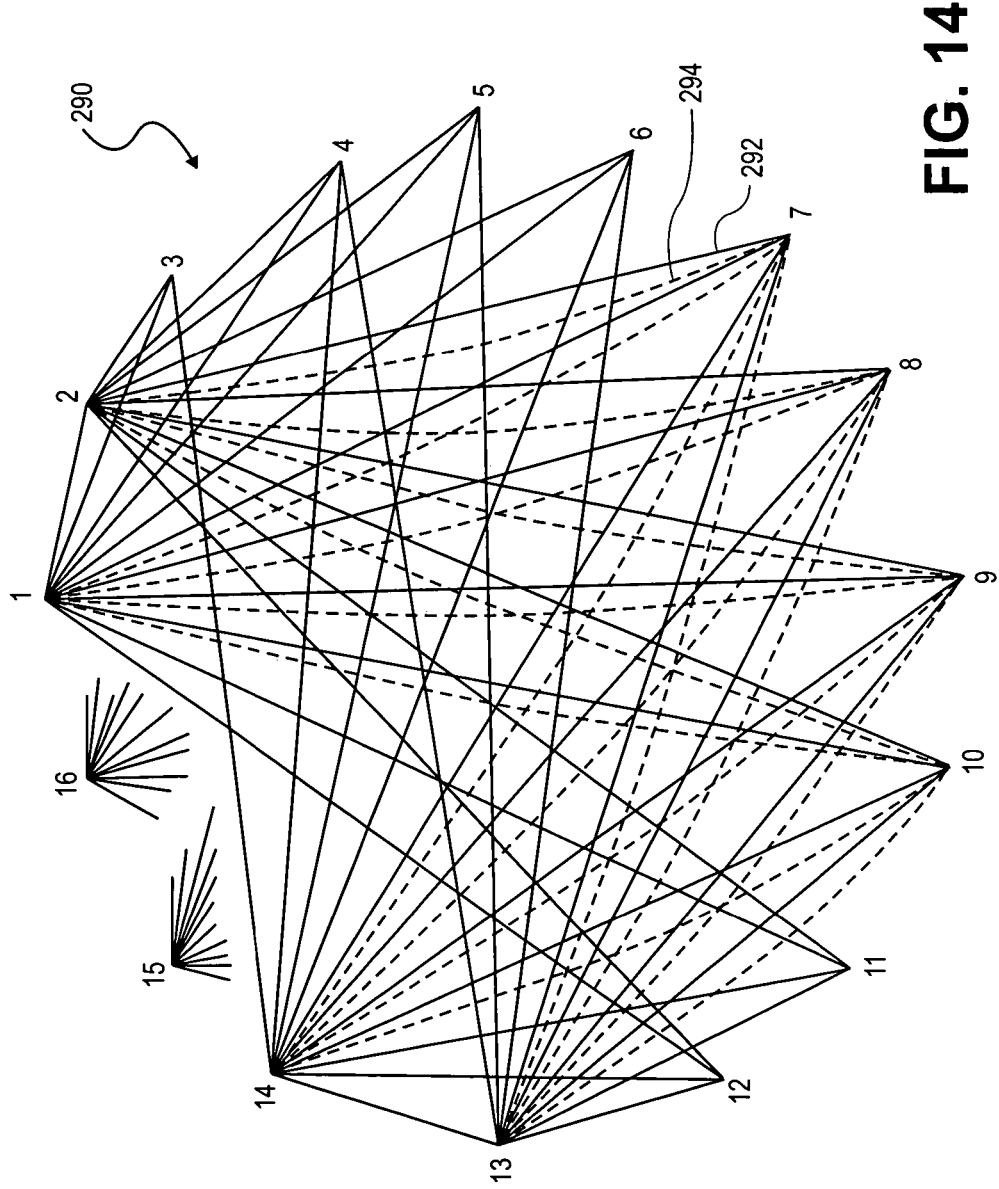
FIG. 14 shows an interconnection topology for the backplane of FIG. 13.

Referring to FIG. 14, the signal lines 282 form an interconnection topology 290 that supports star, dual-star, dual-dual-star, and other types of topologies (other than full-mesh). For clarity of illustration, all channels that connect to slots 1, 2, 13, and 14 are shown, while some channels that connect to slots 3–12 and 15, 16 are shown. Two channels connect each of the extended slots 7–10 to each of the normal slots 1–6 and 11–16, one channel shown as a solid line and the other channel shown as a dashed line. For example, a channel 292 connects a zone 2 connector of slot 2 to a zone 2 connector of slot 7, and a channel 294 connects a zone 2 connector of slot 2 to a zone 3 connector of slot 7. Each normal slot, in addition to connecting to the extended slots 7–10, can connect to seven other normal slots.

Figure 15:
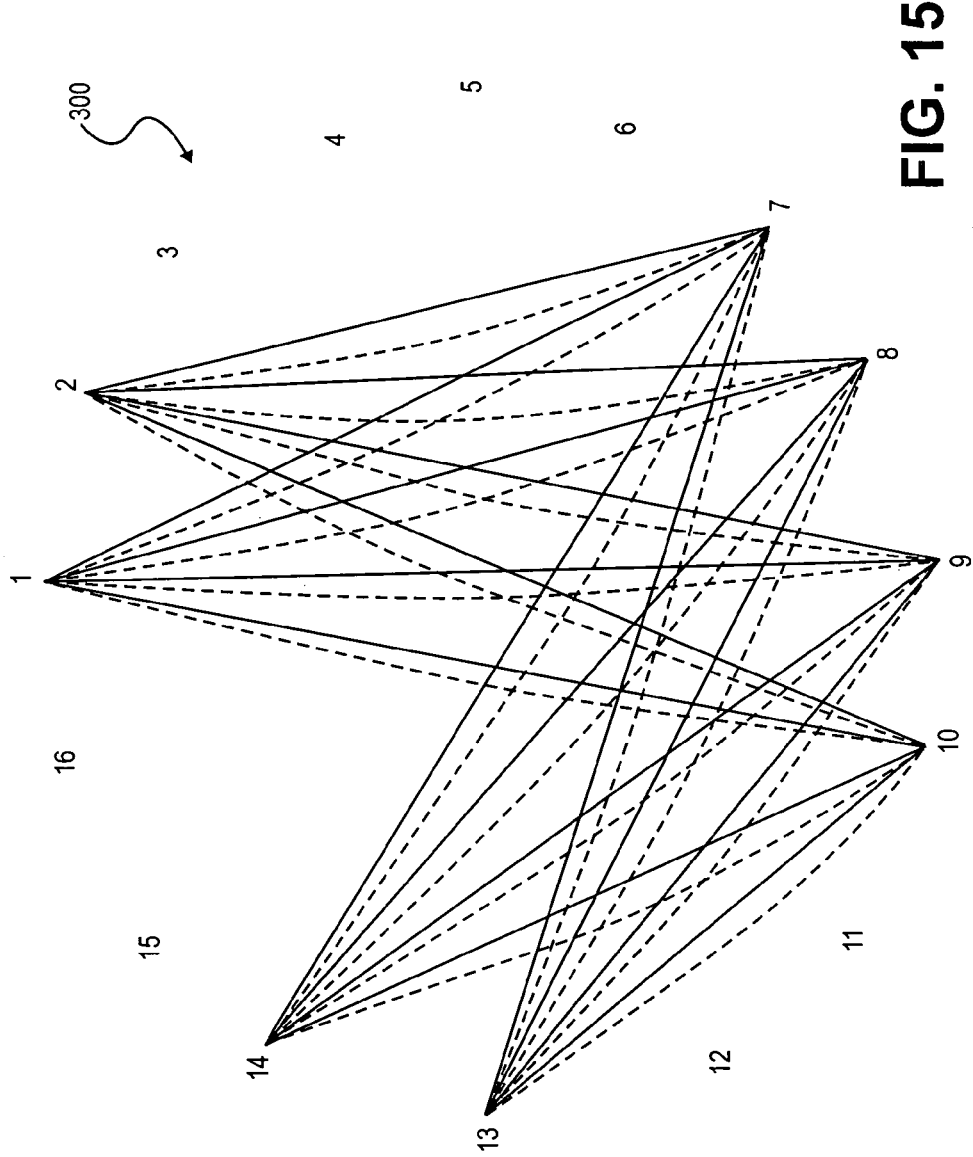
FIG. 15 shows a switch fabric topology supported by the interconnection topology of FIG. 14.

Referring to FIG. 15, the interconnection topology 290 supports a dual-dual-star topology 300, where the normal slots 1–6 and 11–16 interface with normal line cards 106, and the extended slots 7–10 interface with extended switch cards 108, which form four centralized switching hubs. For clarity of illustration, all channels that connect to slots 1, 2, 13, and 14 are shown, some channels that connect to slots 7–10 are shown, and the channels that connect to slots 3–6, 11, 12, 15, and 16 are not shown. Because there are two channels between each line card and each switch card, the dual dual-star topology 290 supports increased data throughput, which can be twice as much as the data throughput provided by conventional ATCA backplanes.

In another example, using the dual-dual-star topology 300, two switch hubs that each use two extended slots can be used to further increase data throughput. The normal slots 1–6 and 11–16 can interface with normal line cards 106. One centralized switch is configured to interface with extended slots 7 and 8. Another centralized switch is configured to interface with extended slots 9 and 10. Because there are four channels between each line card 106 and each centralized switch, the dual-dual-star topology 300 supports increased data throughput (e.g., 40 Gbs), as compared to the data throughput (e.g., 20 Gbs) providing by using a conventional ATCA backplane with switch hubs that each occupy two slots.

Similar to the example in FIG. 10, the interconnection topology 290 supports a dual-star topology (in which two of the extended slots can be used to interface with normal line cards). Similar to the example in FIG. 11, the interconnection topology 290 supports a star topology (in which three of the extended slots can be used to interface with normal line cards). Because there are two channels between each line card and each switch card, the star and dual-star topologies both support increased data throughput that can be twice as much as the data throughput provided by conventional ATCA backplanes.

Figure 16:
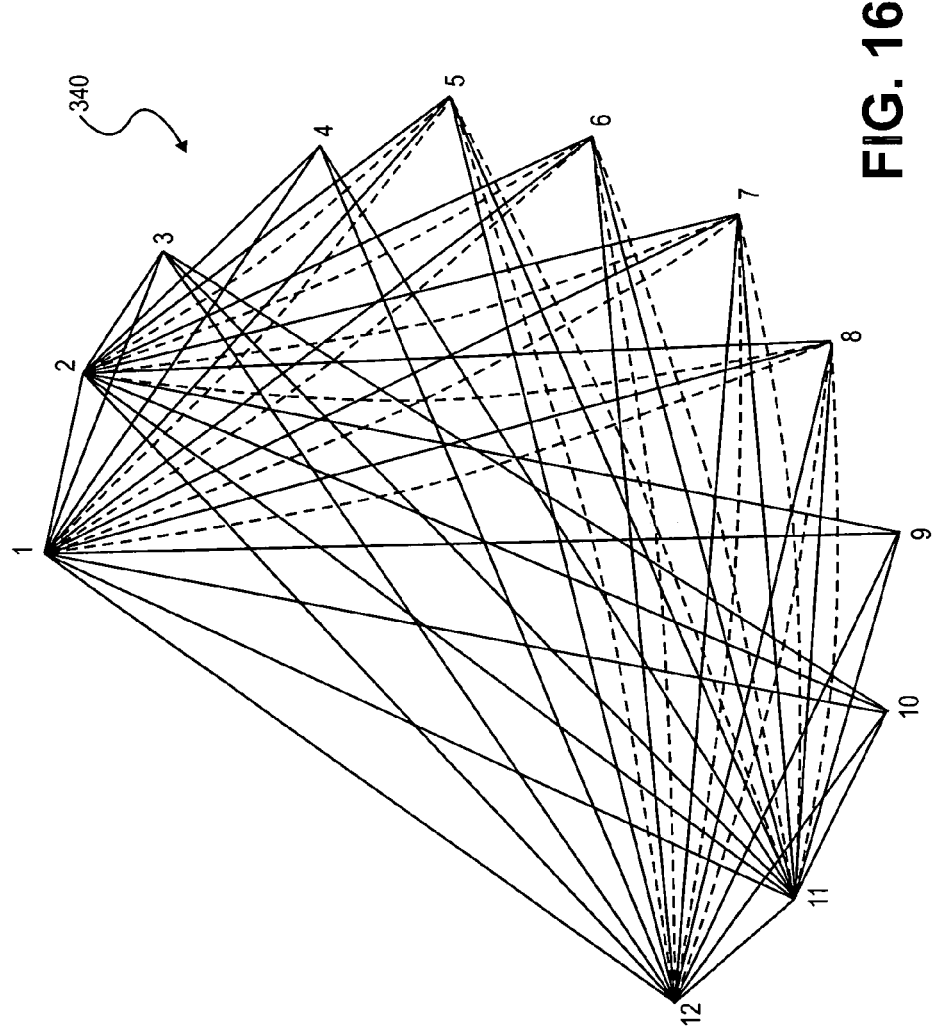
FIG. 16 shows an interconnection topology supported by a backplane having eight normal slots and four extended slots.

In another example of a backplane (not shown) that is similar to backplane 280, twelve slots are supported, including eight normal slots (slots 1–4 and 9–12), and four extended slots (slots 7–10). The backplane can have signal lines that form an interconnection topology 340 (shown in FIG. 16) that supports star, dual-star, dual-dual-star, full-mesh, and other types of topologies.

Figure 17:
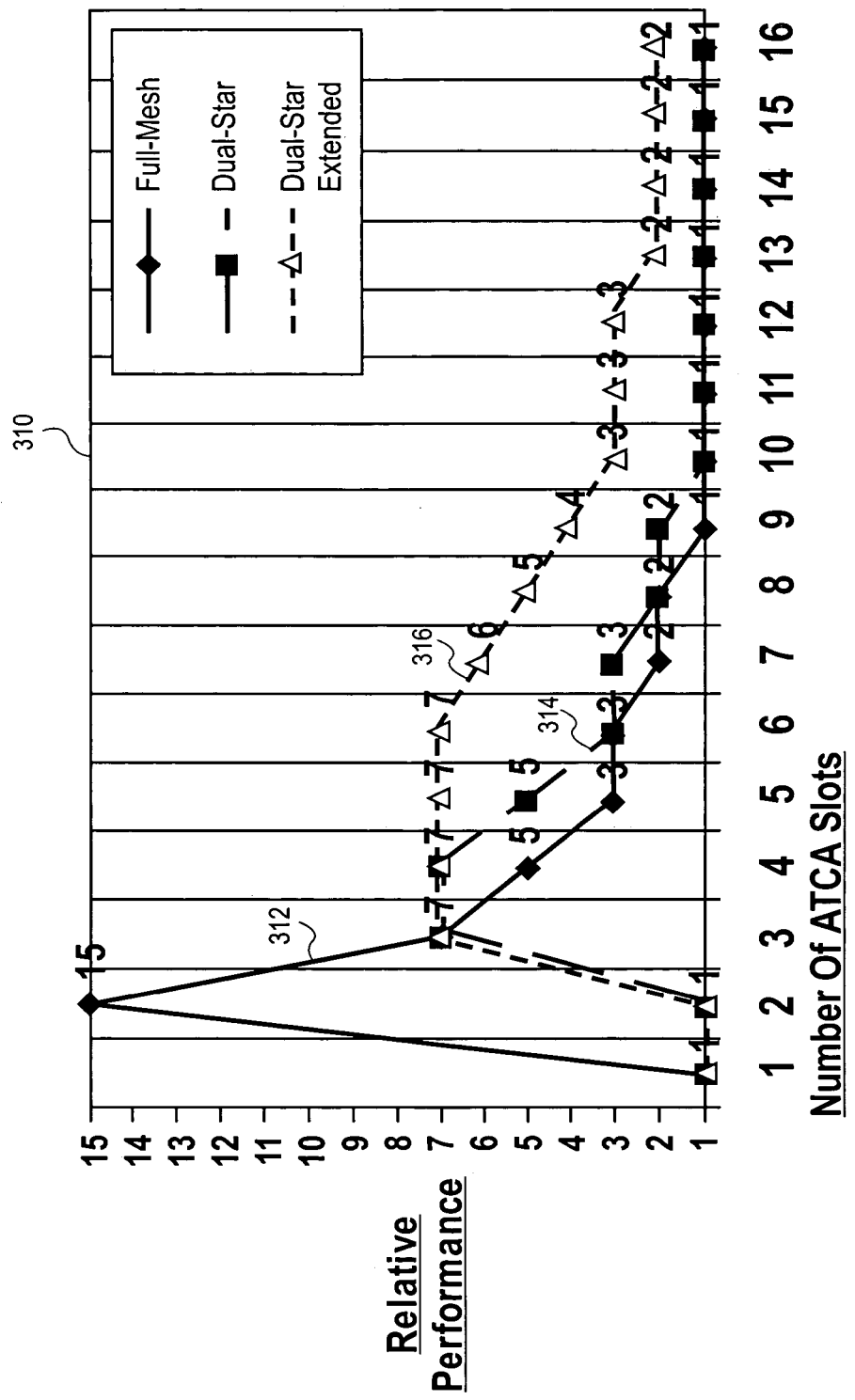
FIG. 17 shows relative performances of systems using conventional ATCA backplanes and systems using extended ATCA backplanes.

Referring to FIG. 17, a chart 310 shows the relative performances of systems using conventional ATCA backplanes (which do not utilize connectors in zone 3 to support the fabric interface) and systems using extended ATCA backplanes (which utilize connectors in zone 3 to support the fabric interface). The horizontal axis represents the number of slots on the backplane, and the vertical axis represents the line switching bandwidth of the system being measured.

Line 312, shown as solid line segments connecting data points (represented as diamonds), represents the performances of systems using conventional ATCA backplanes operating in full-mesh topologies. Line 314, shown as longer dashed line segments connecting data points (represented as squares), represents the relative performances of conventional ATCA backplanes operating in dual-star topologies. Line 316, shown as shorter dashed lines connecting data points (represented as triangles), represent the relative performance of extended ATCA backplanes operating in dual-star topologies.

As the chart 310 shows, for an eight slot chassis, the extended ATCA backplane (using a dual-star topology) supports 2.5 times the performance of the conventional ATCA backplane (using either a full-mesh or dual-star topology). For applications requiring ten, eleven, or twelve slots, the extended ATCA backplane can support up to 3 times the performance of conventional ATCA backplanes. For applications requiring more than twelve slots, the extended ATCA backplane can support up to twice the performance of conventional ATCA backplanes.

Although some examples have been discussed above, other implementations and applications are also within the scope of the following claims. For example, the backplanes (e.g., 104, 240, and 280) do not have to be housed in a cabinet or chassis. The backplanes can be designed according to other specifications, such as CompactPCI™, that specify requirements for connectors used for switch fabric interface, and specify connectors to support user defined functions. The specifications can specify that the connectors used for switch fabric interface and connectors supporting user defined functions be arranged differently than those shown in FIGS. 2, 7, and 11.

Figure 18:
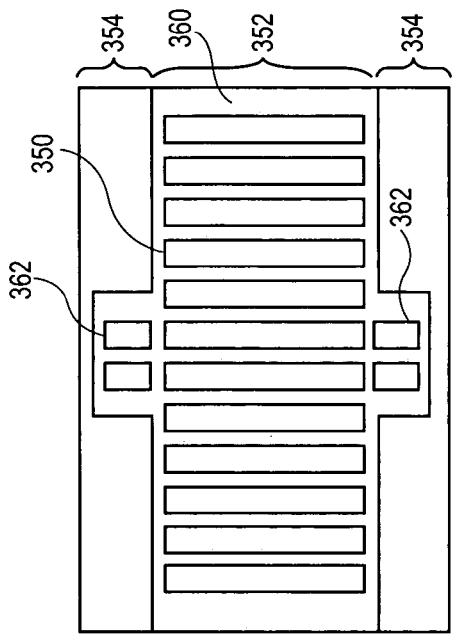
FIG. 18 shows a backplane configuration specified by a specification.
Figure 19:
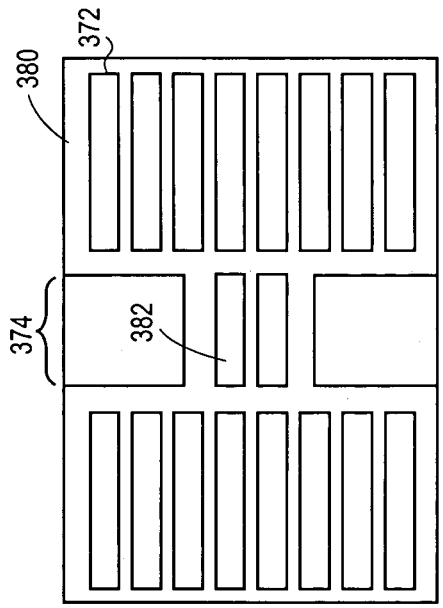
FIG. 19 shows a backplane compatible with the specification of FIG. 18 and having additional connectors.

For example, referring to FIG. 18, a specification can specify that a backplane 358 support connectors 350 used for switch fabric interface in an area 352, and that the backplane provide space in areas 354 that are above and below area 352 for user defined functionalities. FIG. 19 shows a backplane 360 having additional connectors 362 in areas 354, where the connectors 362 support the switch fabric interface to provide additional data channels.

Figure 20:
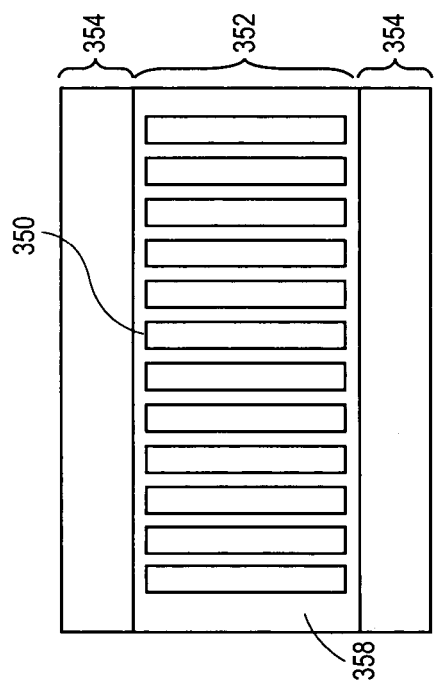
FIG. 20 shows a backplane configuration specified by another specification.
Figure 21:
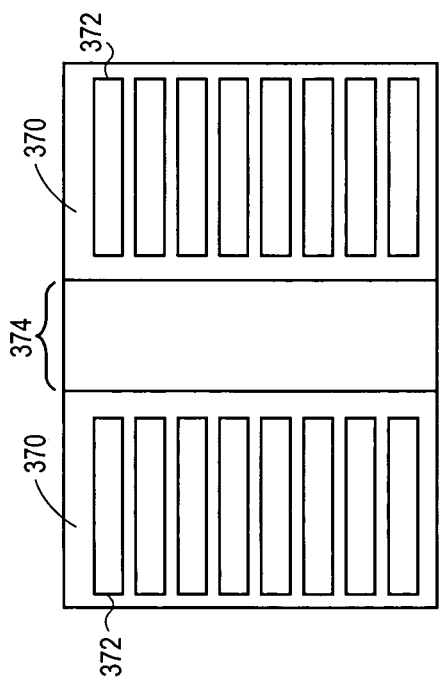
FIG. 21 shows a backplane compatible with the specification of FIG. 20 and having additional connectors.

As another example, referring to FIG. 20, a specification can specify that two or more backplanes 370 that support connectors 372 for switch fabric interface be arranged in a cabinet in which an area (or areas) 374 between the backplanes be used to support user defined functionalities. FIG. 21 shows a backplane 380 having additional connectors 382 in area 374, where the connectors 382 support the switch fabric interface to provide additional data channels.

Each example in FIGS. 19 and 20 provide backward compatibility, so that circuit boards designed according to the original specification can still be used with the new backplanes.

The connectors (e.g., 130, 132) can be different from ZD connectors. The data channels can be configured to have a number of ports and support data rates different from those described above.

A line card 106 can connect to a network (e.g., a local area network, a wide area network, or a metropolitan area network) through multiple ingress and egress lines. Different types of line cards can be used to process data packets according to different communications protocols. Different types of switch cards 108 can be used to process different types of signals depending on the line cards used.

The switch cards 108 can switch electrical signals. The signal lines 138 (of backplane 104), 242 (of backplane 240), or 282 (of backplane 280) can be electric conductors that are positioned on either side of the backplane, or inside the backplane when a multi-layer board is used. The switch cards 108 can switch optical signals. The signal lines can be optical waveguides (e.g., optical fibers), and the connectors can be optical couplers.

The number of extended slots may vary. For example, in a backplane that uses eight slots, where all eight slots are extended slots, a full-mesh interconnect topology can be implemented where each slot has four channels to every other slot. The backplane can support increased data throughput that can be twice as much as the data throughput provided by a conventional ATCA backplane that has eight slots and each slot has two channels to every other slot.

What is claimed is:

1. An apparatus comprising:
   a backplane comprising
      a plurality of slots, the plurality of slots comprising at least one extended slot and at least two normal slots, each normal slot comprising a first set of connectors, each extended slot comprising the first set of connectors and an additional, second set of connectors; and
      signal lines connecting the connectors of the extended and normal slots to support at least one data channel between the first set of connectors of each of one or more of the at least one extended slot and the first set of connectors of each of one or more of the at least two normal slots, and to support at least one data channel between the second set of connectors of each of the one or more of the at least one extended slot and the first set of connectors of each of the one or more of the at least two normal slots,
   at least two line cards that interface with at least two normal slots, and
   at least one switch card that interfaces with the at least one extended slot,
   wherein the line card and the switch card each includes an interface logic to support the data channels between the line card and the switch card.

2. The apparatus of claim 1, wherein each of the plurality of slots comprises a first set of connectors designed according to a common specification, the common specification comprising Peripheral Component Interconnect Industrial Computer Manufacturers Group 3.0 Advanced Telecommunications Computing Architecture (PICMG 3.0 AdvancedTCA) specification.

3. The apparatus of claim 1, wherein the first set of connectors includes connectors that comply with zone 2 connectors of the PICMG 3.0 AdvancedTCA specification.

4. The apparatus of claim 3, wherein the second set of connectors of each extended slot includes connectors that comply with zone 3 connectors of the PICMG 3.0 AdvancedTCA specification.

5. The apparatus of claim 1, wherein the plurality of slots are spaced apart along a first direction, each slot extending along a second direction at an angle to the first direction, the first and second set of connectors of each extended slot being spaced apart along the second direction.

6. The apparatus of claim 1, wherein the backplane has a shape that resembles a letter T or an inverted T.

7. The apparatus of claim 1, wherein the interface logic includes a serializer/deserializer (SERDES) interface.

8. The apparatus of claim 7, wherein the signal lines support data channels between the at least two line cards and the at least one switch card to form at least one of a full-mesh, star, dual-star, and dual-dual-star switch fabric topology.

9. The apparatus of claim 7, wherein the signal lines support data channels between the at least two line cards and the at least one switch card to form any one of a full-mesh, star, dual-star, and dual dual-star switch fabric topology.

10. The apparatus of claim 1, wherein the backplane comprises ten normal slots and four extended slots.

11. The apparatus of claim 1, wherein the backplane comprises twelve normal slots and two extended slots.

12. The apparatus of claim 1, wherein the signal lines include electric conductors.

13. The apparatus of claim 1, wherein the signal lines include optical waveguides.

14. The apparatus of claim 11, wherein the second set of connectors of the two extended slots and the first set of connectors of the twelve normal slots support additional data channels.

15. The apparatus of claim 1, wherein the connectors of each extended slot and each normal slot comprise one or more differential pairs of connectors.

16. The apparatus of claim 1, wherein each of the connectors support one or more ports and each port comprises one or more serializer/deserializers supporting a pre-specified bandwidth.

17. A system comprising
   a plurality of slots, the plurality of slots comprising at least one extended slot and a plurality of normal slots, each normal slot comprising a first set of connectors, each extended slot comprising the first set of connectors and a second set of connectors, and
   signal lines connecting the connectors of the at least one extended slot and one of the plurality of the normal slots to support at least one data channel between the second set of connectors of the at least one extended slot and the first set of connectors of one of the plurality of normal slots, and
   a plurality of additional data channels between the second set of connectors of the at least one extended slot and the first set of connectors of the plurality of normal slots, wherein the plurality of additional data channels enhance bandwidth of switching between the a plurality of line cards coupled to the plurality of slots.

18. The system of claim 17 further comprising a plurality of switch cards and a plurality of line cards, wherein the plurality of line cards and the plurality of switch cards are coupled to one of the plurality of slots.

19. The system of claim 17, wherein the backplane comprises a total of 14 slots comprising 12 normal slots and 2 extended slots and the signal lines between the second set of connectors of the 2 extended slots and the first set of connectors of the 12 normal slots support an additional 15 data channels.

20. The system of claim 17, wherein the at least one extended slot supports coupling of one of a normal switch card or an extended switch card.

21. The system of claim 17, wherein the at least one extended slots and the plurality of normal slots are compatible with a common specification, the common specification comprising Peripheral Component Interconnect Industrial Computer Manufacturers Group 3.0 Advanced Telecommunications Computing Architecture (PICMG 3.0 AdvancedTCA) specification.

22. A system comprising
a plurality of slots, the plurality of slots comprising at least one extended slot and a plurality of normal slots, each normal slot comprising a first set of connectors, each extended slot comprising the first set of connectors and a second set of connectors,
signal lines connecting the connectors of the at least one extended slot and one of the plurality of the normal slots to support at least one data channel between the second set of connectors of the at least one extended slot and the first set of connectors of one of the plurality of normal slots, and
a plurality of switch cards and a plurality of line cards, wherein the plurality of line cards and the plurality of switch cards are coupled to the plurality of slots,
wherein the at least one extended slot supports coupling of one of a normal line card or an extended line card, the plurality of line cards comprise the normal line card and the extended line card.

23. The system of claim 22, wherein the backplane comprises a total of 14 slots comprising 12 normal slots and 2 extended slots and the signal lines between the second set of connectors of the 2 extended slots and the first set of connectors of the 12 normal slots support an additional 15 data channels.

24. The system of claim 22, wherein the at least one extended slot supports coupling of one of a normal switch card or an extended switch card, the plurality of switch cards comprise the normal switch card and the extended switch card.

25. The system of claim 22, wherein the at least one extended slots and the plurality of normal slots are compatible with a common specification, the common specification comprising Peripheral Component Interconnect Industrial Computer Manufacturers Group 3.0 Advanced Telecommunications Computing Architecture (PICMG 3.0 AdvancedTCA) specification.

* * * * *